Patented Nov. 11, 1941

2,261,998

UNITED STATES PATENT OFFICE 2,261,998

PROCESS OF PREPARING A CYCLIC HYDROCARBON

Paul Heisel and Hermann Dewein, Gersthofen, near Augsburg, Germany, assignors to I. G. Farbenindustrie Aktiengesellschaft, Frankfort-on-the-Main, Germany No Drawing. Application September 14, 1937, Serial No. 163,805. In Germany September 24, 1936

1 Claim. (Cl. 260—666)

The present invention relates to cyclic hydrocarbon and to a process of preparing it.

In our co-pending application Serial No. 163,806 filed September 14, 1937 relating to "Diterpene and a process of preparing it" we have described a process according to which a diterpene of the formula $C_{20}H_{32}$ can be obtained in a very good yield and purity.

We have found that this body can readily be dehydrogenized on an industrial scale and in a nearly quantitative yield so as to obtain a cyclic hydrocarbon by heating the diterpene $C_{20}H_{32}$ at a temperature above about 200° C., however not above about 350° C., together with a substance having an active surface, such as activated carbon, or with kieselguhr or silica gel or with a similar catalyst, such as glass wool, activated with a metal salt, such as aluminum chloride, zinc chloride or stannic chloride. It is particularly simple and convenient to use the catalyst used during the manufacture of the diterpene from the cyclic monoterpene, that is carbon activated with phosphoric acid as described in the application above referred to. Surprisingly the dehydrogenation does not continue until the stage theoretically to be expected i. e. the complete dehydrogenation of the two six-membered rings has been attained, but ceases after separation of 4 atoms of hydrogen. The new hydrocarbon obtained during the dehydrogenation with the use of a body having an active surface or of the carbon activated with phosphoric acid cannot, strange to say, be further dehydrogenized at a high temperature, even with application of palladium carbon. The new hydrocarbon is a colorless, viscous oil having a blue fluorescence and a specific gravity of 0.94. It distills at 150° C. to 160° C. under a pressure of 4 millimeters without decomposition. It is particularly useful as a parent material for the manufacture of dyestuffs and adjuvants for the textile industry. For obtaining the new hydrocarbon it is not necessary to isolate the diterpene $C_{20}H_{32}$ in a pure form before the dehydrogenation. With the same good success the crude product still containing more highly polymerized products can be dehydrogenized without difficulty in the manner above described. The hydrocarbon of the formula $C_{20}H_{28}$ can be isolated from the dehydrogenation mixture by a fractional distillation under reduced pressure, or the dehydrogenation mixture may be further used in its crude form.

The following example serves to illustrate the invention, but it is not intended to limit it thereto:

100 kilos of diterpene prepared as described in the application above referred to are heated to about 300° C., together with 3 kilos of activated carbon which has been treated with phosphoric acid, until a separation of hydrogen can no longer be observed. After the carbon has been separated the dehydrogenized oil is subjected to distillation under reduced pressure. There are obtained 95 kilos of the new hydrocarbon of the formula $C_{20}H_{28}$.

We claim:

The process which comprises heating dipentene to its boiling point in the presence of phosphoric acid applied to activated carbon and then heating the diterpene thus obtained to temperatures between about 200° C. and about 350° C. in the presence of a catalyst of the group consisting of phosphoric acid and phosphorus pentoxide applied to activated carbon.

PAUL HEISEL.
HERMANN DEWEIN.